US008301882B2

(12) United States Patent
Smith

(10) Patent No.: US 8,301,882 B2
(45) Date of Patent: Oct. 30, 2012

(54) METHOD AND APPARATUS FOR INGRESS FILTERING USING SECURITY GROUP INFORMATION

(75) Inventor: Michael R. Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/917,125

(22) Filed: Nov. 1, 2010

(65) Prior Publication Data

US 2011/0271102 A1 Nov. 3, 2011

Related U.S. Application Data

(63) Continuation of application No. 11/000,706, filed on Dec. 1, 2004, now Pat. No. 7,827,402.

(51) Int. Cl.
*H04L 29/06* (2006.01)
*G06F 7/04* (2006.01)
*G06F 17/30* (2006.01)
(52) U.S. Cl. .............................. 713/160; 713/151; 726/2
(58) Field of Classification Search .................. 713/151, 713/160; 726/2
See application file for complete search history.

(56) References Cited

U.S. PATENT DOCUMENTS

| | | | |
|---|---|---|---|
| 4,922,486 A | 5/1990 | Lidinsky et al. | 370/60 |
| 5,017,917 A | 5/1991 | Fisher et al. | 340/14.1 |
| 5,113,442 A | 5/1992 | Moir | 713/167 |
| 5,251,205 A | 10/1993 | Callon et al. | 370/60 |
| 5,615,264 A | 3/1997 | Kazmierczak | 705/52 |
| 5,764,762 A | 6/1998 | Kazmierczak | 705/52 |
| 5,787,427 A | 7/1998 | Benantar et al. | 707/9 |
| 5,845,068 A | 12/1998 | Winiger | 395/186 |
| 5,911,143 A | 6/1999 | Deinhart et al. | 707/103 |
| 5,941,947 A | 8/1999 | Brown et al. | 709/225 |
| 5,968,177 A | 10/1999 | Batten-Carew et al. | 726/4 |
| 6,014,666 A | 1/2000 | Helland et al. | 707/9 |
| 6,023,765 A | 2/2000 | Kuhn | 713/200 |
| 6,052,456 A | 4/2000 | Huang | 379/201.04 |
| 6,088,659 A | 7/2000 | Kelley et al. | 702/62 |
| 6,092,191 A | 7/2000 | Shimbo et al. | 713/153 |
| 6,202,066 B1 | 3/2001 | Barkley et al. | 707/9 |

(Continued)

FOREIGN PATENT DOCUMENTS

EP 0 465 016 A2 6/1991

(Continued)

OTHER PUBLICATIONS

Wang, Ning and Pavlou, George, Scalable Sender Access Control for Bi-directional Multicast Routing, Computer Networks, Elsevier Science Publishers B.V., vol. 43, No. 5, Dec. 5, 2003, pp. 539-555.

(Continued)

*Primary Examiner* — Christian Laforgia
(74) *Attorney, Agent, or Firm* — Samuel G. Campbell, III; Campbell Stephenson LLP

(57) ABSTRACT

A method and apparatus for ingress filtering using security group information are disclosed. The method includes performing access control processing on a packet and sending access control information to an ingress node of the packet in response to the access control processing. The access control information includes security group information and an address of a network node. The security group information identifies a security group. The network node is a member of the security group and is a destination of the packet.

20 Claims, 12 Drawing Sheets

U.S. PATENT DOCUMENTS

| | | | | |
|---|---|---|---|---|
| 6,233,618 | B1 | 5/2001 | Shannon | 709/229 |
| 6,271,946 | B1 | 8/2001 | Chang et al. | 398/79 |
| 6,289,462 | B1 | 9/2001 | McNabb et al. | 713/201 |
| 6,292,798 | B1 | 9/2001 | Dockter et al. | 707/9 |
| 6,292,900 | B1 | 9/2001 | Ngo et al. | 713/200 |
| 6,304,973 | B1 | 10/2001 | Williams | 713/201 |
| 6,405,259 | B1 | 6/2002 | Cheston et al. | 709/245 |
| 6,449,643 | B1 | 9/2002 | Hyndman et al. | 709/223 |
| 6,711,172 | B1 | 3/2004 | Li | 370/401 |
| 6,754,214 | B1 | 6/2004 | Mahalingaiah | 370/392 |
| 6,823,462 | B1 | 11/2004 | Cheng et al. | 726/15 |
| 6,973,057 | B1 | 12/2005 | Forslow | 370/328 |
| 6,985,948 | B2 | 1/2006 | Taguchi et al. | 709/225 |
| 7,000,120 | B1 | 2/2006 | Koodli et al. | 713/201 |
| 7,023,863 | B1 | 4/2006 | Naudus et al. | 370/401 |
| 7,032,243 | B2 | 4/2006 | Leerssen et al. | 726/17 |
| 7,136,374 | B1 | 11/2006 | Kompella | 370/352 |
| 7,207,062 | B2 | 4/2007 | Brustoloni | 726/13 |
| 7,284,269 | B2 | 10/2007 | Marquet et al. | 726/13 |
| 7,350,077 | B2 | 3/2008 | Meier et al. | 713/171 |
| 7,417,950 | B2 | 8/2008 | Hofmeister et al. | 370/230 |
| 7,437,755 | B2 | 10/2008 | Farino et al. | 726/5 |
| 7,506,102 | B2 | 3/2009 | Lev-Ran et al. | 711/118 |
| 7,530,112 | B2 | 5/2009 | Smith | 726/28 |
| 7,660,259 | B1 | 2/2010 | Grosser | 370/252 |
| 7,827,402 | B2* | 11/2010 | Smith | 713/160 |
| 7,877,601 | B2* | 1/2011 | Smith et al. | 713/160 |
| 7,877,796 | B2* | 1/2011 | Smith | 726/13 |
| 7,886,145 | B2* | 2/2011 | Smith et al. | 713/160 |
| 2002/0026592 | A1 | 2/2002 | Gavrila et al. | 713/201 |
| 2002/0035635 | A1 | 3/2002 | Holden | 709/230 |
| 2002/0184521 | A1 | 12/2002 | Lucovsky et al. | 713/200 |
| 2003/0051155 | A1 | 3/2003 | Martin | 713/201 |
| 2003/0088786 | A1 | 5/2003 | Moran et al. | 713/201 |
| 2003/0110268 | A1 | 6/2003 | Kermarec et al. | 709/227 |
| 2003/0140246 | A1 | 7/2003 | Kammer et al. | 713/201 |
| 2003/0145232 | A1 | 7/2003 | Poletto et al. | 713/201 |
| 2003/0154400 | A1 | 8/2003 | Pirttimaa et al. | 713/201 |
| 2003/0177381 | A1 | 9/2003 | Ofek | 713/200 |
| 2004/0017816 | A1 | 1/2004 | Ishware et al. | 370/395.53 |
| 2004/0044908 | A1 | 3/2004 | Markham et al. | 713/201 |
| 2004/0064688 | A1 | 4/2004 | Jacobs | 713/150 |
| 2004/0156313 | A1 | 8/2004 | Hofmeister et al. | 370/229 |
| 2004/0160903 | A1 | 8/2004 | Gai et al. | 370/254 |
| 2004/0181690 | A1 | 9/2004 | Rothermel et al. | 713/201 |
| 2004/0202171 | A1 | 10/2004 | Hama | 370/395.1 |
| 2004/0264697 | A1 | 12/2004 | Gavrilescu et al. | 380/255 |
| 2004/0268123 | A1 | 12/2004 | Le et al. | 713/160 |
| 2005/0055573 | A1 | 3/2005 | Smith | 713/201 |
| 2005/0097357 | A1 | 5/2005 | Smith | 713/201 |
| 2005/0125692 | A1 | 6/2005 | Cox et al. | 713/201 |
| 2005/0129019 | A1 | 6/2005 | Cheriton | 370/392 |
| 2005/0177717 | A1 | 8/2005 | Grosse | 713/160 |
| 2005/0190758 | A1 | 9/2005 | Gai et al. | 370/389 |
| 2005/0198412 | A1 | 9/2005 | Pedersen et al. | 710/30 |
| 2006/0010483 | A1 | 1/2006 | Buehler | 726/1 |
| 2006/0090208 | A1 | 4/2006 | Smith | 726/26 |
| 2006/0106750 | A1 | 5/2006 | Smith | 707/1 |
| 2006/0112425 | A1 | 5/2006 | Smith et al. | 726/13 |
| 2006/0112426 | A1 | 5/2006 | Smith et al. | 726/13 |
| 2006/0112431 | A1 | 5/2006 | Smith et al. | 726/22 |
| 2006/0117058 | A1* | 6/2006 | Smith | 707/102 |
| 2007/0094716 | A1 | 4/2007 | Farino et al. | 726/5 |
| 2009/0019538 | A1 | 1/2009 | Pandya | 726/13 |
| 2009/0049196 | A1 | 2/2009 | Smith et al. | 709/245 |
| 2009/0097490 | A1 | 4/2009 | Sanderson et al. | 370/395.53 |
| 2009/0328186 | A1 | 12/2009 | Pollutro et al. | 726/13 |
| 2010/0223657 | A1 | 9/2010 | Finn et al. | 726/3 |
| 2010/0235544 | A1 | 9/2010 | Smith et al. | 709/246 |
| 2011/0004923 | A1 | 1/2011 | Smith et al. | 726/4 |
| 2011/0119752 | A1 | 5/2011 | Smith et al. | 726/13 |

FOREIGN PATENT DOCUMENTS

| | | | | |
|---|---|---|---|---|
| EP | 0 697 662 A1 | 2/1996 | | 12/14 |
| EP | 0 849 680 A2 | 12/1997 | | |
| EP | 1 067 745 A2 | 11/1999 | | |
| JP | 2002 164937 | 6/2002 | | |
| WO | WO 2005/027464 | 3/2005 | | |

OTHER PUBLICATIONS

Valenzi, Kathleen D., Digital Signatures: An Important "Sign" of the Future of E-Government, Virginia.Edu, vol. IV, No. 2, Fall 2000, Copyright 2000, The Rector and Board of Visitors of the University of Virginia, 6 pages.

Pfleeger et al., Security in Computing, 2003, Prentice Hall, $3^{rd}$ Ed., pp. 194-207.

Barkley et al., Supporting Relationships in Access Control Using Role Based Access Control, Jul. 1999.

Islam, An Access Control Method with Subject-Object Key and Time Stamp, Jun. 2003, Malaysian Journal of Computer Science, vol. 16, No. 1, pp. 77-83.

IEEE Standard for Information Technology—Telecommunications and Information Exchange Between Systems-Local and Metropolitan Area Networks—Common Specifications, *Part 3: Media Access Control (MAC) Bridges*, ANSI/IEEE Std. 802.1D, 1998 Edition, Dec. 10, 1998, pp. 1-355.

Computer Systems Laboratory, National Institute of Standards and Technology, *Standard Security Label for Information Transfer*, Federal Information Processing Standards Publication 188 (FIPS PUB 188), Category: Computer Security, Subcategory: Security Labels, Sep. 6, 1994, pp. 1-25.

Microsoft® Computer Dictionary, Fifth Edition, Publisher: Microsoft Press, Pub. Date: May 1, 2002, Excerpt of terms: digital signature—digital signature standard & routable protocol—routing table, p. 656.

Stevens, Richard W., TCP/IP Illustrated vol. 1, The Protocols, Copyright © 1994 Addison Wesley Longman, Inc., pp. 112-117.

CDAT Overview, http: www.cisco.com/universalcd/cc/td/doc/, Solution/sesm/sesm_313toolguid/chi1_overview.htm., Copyright 1992-2002 Cisco Systems, Inc.

* cited by examiner

Fig. 3

Access Control List 300

| Access Control List Entry | Flow Label Field | SSG Field | DSG Field | Other Flow Specification Fields |
|---|---|---|---|---|
| 310(1) | 320(1) | 330(1) | 340(1) | 350(1) |
| 310(2) | 320(2) | 330(2) | 340(2) | 350(2) |
| 310(3) | 320(3) | 330(3) | 340(3) | 350(3) |
| 310(4) | 320(4) | 330(4) | 340(4) | 350(4) |
| ... | ... | ... | ... | ... |
| 310(N-1) | 320(N-1) | 330(N-1) | 340(N-1) | 350(N-1) |
| 310(N) | 320(N) | 330(N) | 340(N) | 350(N) |

METHOD AND APPARATUS FOR INGRESS FILTERING USING SECURITY GROUP INFORMATION

CROSS-REFERENCE TO RELATED APPLICATIONS

This application is a continuation of U.S. patent application Ser. No. 11/000,706, entitled "Method and Apparatus for Ingress Filtering Using Security Group Information, filed Dec. 1, 2004 now U.S. Pat. No. 7,827,402, naming Michael R. Smith as the inventor. This application is assigned to Cisco Technology, Inc., the assignee of the present invention, and is hereby incorporated by reference, in its entirety and for all purposes.

BACKGROUND OF THE INVENTION

1. Field of the Invention

This invention relates to the field of information network security, and more particularly relates to a method and apparatus for processing network traffic using security group information.

2. Description of the Related Art

Flexible network access technologies such as wireless, Dynamic Host Configuration Protocol (DHCP), virtual private network (VPN) gateways and the like allow users access to a given protected network from a variety of access or entry points. This is true of all manner of networks, including enterprise networks, service provider networks and the like. At the same time, the security afforded while providing such access is of increasing concern. Technologies based on Remote Authentication Dial-In User Service (RADIUS), Terminal Access Controller Access Control System (TACACS) and other protocols allow a user to be authenticated upon entry to the network.

As is known, communications paths across such networks are conceptually separate (e.g., can be viewed as separate virtual paths), although they may traverse some or all of the same network devices (i.e., physical segments), and so are controlled separately using, for example, access control lists (ACLs). Conventionally, constraints upon access enjoyed by network users are enforced by ACLs, which are used to process packets and so control the network traffic of such users. For scalability and manageability, conventional ACLs require the mapping of a user host address (as the source of the given packet(s); for example, an internet protocol (IP) address) to be relatively static, or the security policy be sufficiently lax to allow all possible addresses possible for the user.

Today's security ACLs suffer from a number of infirmities. These ACLs are conventionally applied to a given interface and contain IP addresses which tie the security policy directly to the network topology. As a result, a change in the network such as repartitioning of sub-nets causes the security policy to be revisited. Moreover, it would appear that ACLs in various parts of the network would need to be updated each time a user authenticated to the network, in order to add rules associated with the source IP address assigned to this user's host, which would be specific to that user. This would cause a huge increase in the number of unique ACLs and dramatically increase the rate at which such rules would have to be updated. Within a given ACL, there also exists the problem of dramatic increases in size resulting from the expression of individual IP addresses, where the number of entries is often the number of source addresses multiplied by the number of destination addresses, multiplied by the number of permissions. Thus, the addition of a single individual IP address can have a significant impact on the size of a substantial number of ACLs.

When a customer changes the network topology, the ACLs must be reexamined. Since such ACLs can quite easily reach several hundred or even several thousand of lines in length, such a reexamination can be non-trivial, to say the least. Due to the complexity of such an ACL, the confidence in the changes that are made is not very high, typically, and the ACLs often require extensive testing by the user before being placed in a production environment. Moreover, because platforms using content-addressable memories (CAMs) to implement ACLs require recompiling of some or all of the ACLs when any change is made, the increases in processing cost can be quite severe, approaching a quadratic in the number of users. These increases in complexity increase the chance of a network outage, a security hole, or both. A single ACL stretches a user's ability to manage their security policy. Placing such ACLs throughout the enterprise network therefore impacts the manageability of today's networks. Given the foregoing, particularly in light of the increasingly flexible access that is required now and will be required in the future, relying on existing ACL-based solutions is difficult.

Compounding this problem is the often belated application of such ACLs, which typically occurs at the network edge on the egress side of the network. Because the ACLs of a sub-net are known to the egress router coupled to that sub-net, application of those ACLs is performed by that egress network device (or more simply egress node (e.g., an egress router)). This results in packets being sent across the core of the network, only to be discarded at the egress node. Thus, the network core is forced to carry a significant amount of traffic unnecessarily.

What is required, then, is a mechanism that allows for the efficient identification of network traffic to a given destination, and does so as early as possible in a packet's traversal of the network (preferably, at the packet's ingress node). Preferably, such an approach should be compatible with existing ACL technology, as well as future ACL technology, thus reducing or eliminating the problem of multiplicative ACL growth. Also preferably, such an approach should allow the network to be easily reconfigured and grow, without incurring a disproportionate administrative burden or consuming inordinately large amounts of network resources. Such an approach should also minimize the amount of unnecessary network traffic.

BRIEF DESCRIPTION OF THE DRAWINGS

The present invention may be better understood, and numerous objects, features, and advantages made apparent to those skilled in the art by referencing the accompanying drawings.

FIG. 3 is a diagram illustrating an example of an access control list (ACL) according to embodiments of the present invention.

The use of the same reference symbols in different drawings indicates similar or identical items.

DETAILED DESCRIPTION OF THE INVENTION

Figure 1:
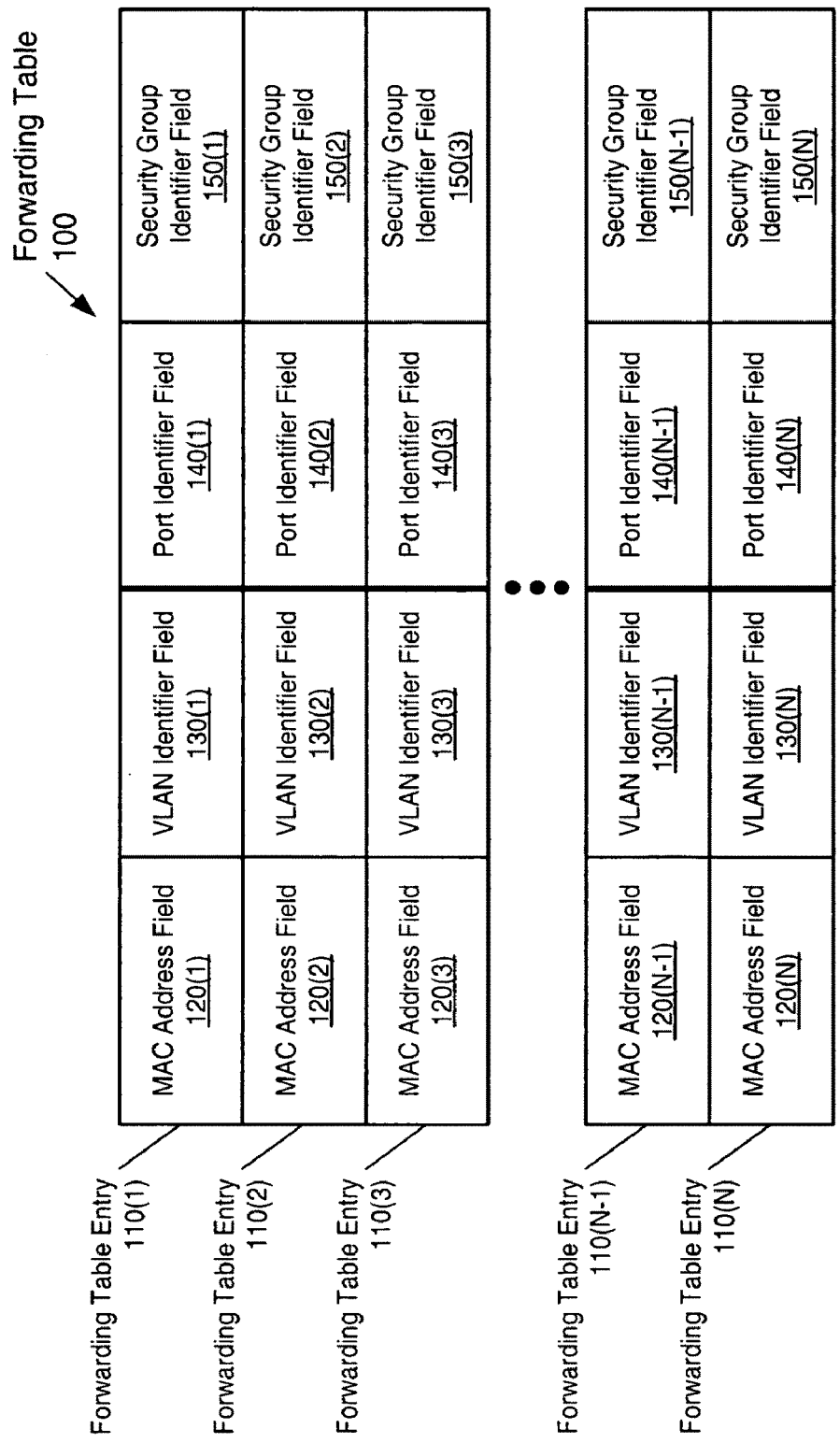
FIG. 1 is a diagram illustrating a forwarding table according to embodiments of the present invention.

The following is intended to provide a detailed description of an example of the invention and should not be taken to be limiting of the invention itself. Rather, any number of variations may fall within the scope of the invention which is defined in the claims following the description.
Introduction The present invention provides a method and apparatus that addresses the limitations outlined above through the use of role-based access control lists (RBACLs) in conjunction with an ingress filtering technique that pushes the point at which RBACLs are applied, from a packet's egress node to the packet's ingress node. RBACLs control network traffic by enforcing the permissions to be applied to that network traffic, based on the role(s) of a packet's source and destination. By moving the point at which a given RBACL is applied (i.e., with regard to permitting or denying of a packet) to a packet's ingress node, the present invention significantly reduces the amount of network traffic within the network core.

A method and apparatus according to the present invention represent the aforementioned roles using security groups in the context of a network (e.g., an enterprise network). In so doing, the present invention provides a basis for network security. Authenticated network entities (hosts, servers, internet protocol (IP) telephones and the like) are assigned to a specific security group for the purpose of making access control decisions, based on their role(s) within the organization (and so, network). As a packet traverses the network, the packet carries information regarding the security group membership of the packet's source in the form of security group information (e.g., a security group identifier such as a source group tag (SGT)), which can be cryptographically authenticated if such encryption is supported by the network. When the first packet is sent from a source to a destination, the security group information of the packet's source is associated with the packet. The source's security group information is then used to perform access control processing at the egress edge of the network, along with the security group membership of the packet's destination.

In one embodiment, an entity (e.g., a user) is given membership in one or more security groups based on that user's role(s). Each security group may represent one role, or a number of roles. In turn, permission lists implementing network security policies are applied in deciding whether to permit communication between entities on the network. This information can then be used to make a determination as to the handling of a packet sourced by a given entity. For example, when a packet is sourced onto the network, information regarding the source's security group can be inserted into the packet. Communication of this security group information can be implemented in a number of ways. For example, the information can be implemented as a source group tag (a tag indicating the group to which the source belongs) that is inserted into or associated with the packet in some manner, although other methods can be employed.

As the packet traverses the network, the source group information is carried along with the other information in the packet. At the egress edge of the network, the destination group can be derived. For example, at the "L3" edge (the network device at the edge of the layer 3 network in a network implementing the Open System Interconnect (OSI) model), the destination group can be derived from the network device's forwarding information base (FIB) via the fully resolved host prefix. The host prefix is resolved through the address resolution protocol (ARP). The ARP response is tagged with the destination group when the packet is sourced onto the network. The FIB result is populated with the destination group in addition to the rewrite information. Once the source and destination groups have been determined, the permissions (the relevant ACL entry) can be determined by the egress node. However, as noted, making this determination at the ingress node is desirable for a number of reasons.

To propagate a destination's security group information from a packet's egress node to the packet's ingress node, the present invention provides mechanisms that allow for the determination of (or obtaining of) the destination's security group information at the egress node, and then propagating this information to the ingress node by sending the information from node-to-node, until the information arrives at the packet's ingress node. By propagating this information to the packet's ingress node, the ingress node is then able to perform access control prior to sending the packet through the network, thereby providing the benefits described subsequently.

The present invention provides a number of advantages. As noted, the present invention reduces the demand for processing and network bandwidth by reducing the amount of network traffic that the network must carry. The present invention does not require additional hardware support (in comparison to network hardware that does not support the present invention), and can be implemented in a manner that takes advantage of standard protocol's existing features. Moreover, the present invention does not require network topology changes, and is able to dynamically adapt to changes within the network. The present invention also provides advantages to the customer, including a certain level of resistance to distributed denial of service (DDOS) attacks, bandwidth savings in the core of the enterprise network, and prevention of reconnaissance attacks such as ping sweeps and the like, with no impact on hardware cost and minimal software overhead.

The Implementation of Roles in an Authentication Architecture

In one embodiment of the present invention, hierarchical security groups (SGs) are defined to include a number of groups, each having a hierarchical relationship to one or more other groups. Each child group inherits permissions from its parent group and extends those permissions with its own. Typically, a user in a child security group will have access to more of the computing and informational resources of the organization than will a user in parent security group. As will be apparent, the further one traverses down in a security group hierarchy, in one embodiment, the greater the level of responsibility, and so, the greater the amount of access.

Alternatively, disjoint SGs can be used where there are non-overlapping, equal, and non-related functions. In the actual implementation of RBACLs, hierarchical SGs can be implemented using disjoint SGs and the hierarchy management (if present) can be made the responsibility of the network management entity responsible for configuring the RBACLs. Such disjoint SGs are used in situations in which there are non-overlapping, equal and non-related functions performed by the groups in question. Because the responsibilities of each of these groups is so different and distinct from that of the other groups, each of these groups would be expected to have their own set of resources, accessible by members of the given group. Thus, it would expected that the users in a given security group would maintain the same set of permissions, allowing them access to the same set of resources, although this need not strictly be the case.

It will be appreciated that groups of users are put into the same group because they share the same permissions. This creation of groups does not imply that no communications occur between or across security groups. Nor does this imply that there is no permission enforcement within a given group. It simply implies that as a group, the users will have substantially the same privileges within the network.

More detailed examples of security group hierarchies and disjoint security groups are given in patent application Ser. No. 10/659,614, filed Sep. 10, 2003, and entitled "Method and Apparatus for Providing Network Security Using Role-Based Access Control," having Michael R. Smith as inventor, which is hereby incorporated by reference herein, in its entirety and for all purposes.

The implementation of RBACLs typically includes a number of operations. These operations include 1. Source Security group (SSG) determination
2. Destination Security group (DSG) determination
3. Permissions determination
4. Permissions enforcement These operations are described in connection with FIGS. 1-7, below.

FIG. 1 is a block diagram illustrating a forwarding table 100 according to the present invention. Forwarding table 100 includes a number of forwarding table entries (depicted in FIG. 1 as forwarding table entries 110(1)-(N)). Each of forwarding table entries 110(1)-(N) includes a number of fields, certain of which are depicted in FIG. 1. Among these fields are a MAC address field (depicted as MAC address fields 120(1)-(N)), a virtual local area network (VLAN) identifier field (depicted as VLAN identifier fields 130(1)-(N)), a port identifier field (depicted as port identifier fields 140(1)-(N)), and a security group identifier (tag) field (depicted as security group identifier fields 150(1)-(N)).

When the media access control (MAC) address and VLAN have been authenticated on a given port, the security group retrieved during the authentication process is assigned to the MAC address/VLAN identifier combination. This information appears in forwarding table 100 in MAC address fields 120(1)-(N) and VLAN identifier fields 130(1)-(N). Forwarding table 100 thus contains the MAC address/VLAN identifier combinations that can be used as a look-up key with the result of the look-up providing the port identifier (as stored in the appropriate one of port identifier fields 140(1)-(N)) and the security group identifier (as stored in a corresponding one of security group identifier fields (150(1)-(N)).

It will be noted that, in one implementation, when a packet is sent by a host, the layer 2 learning look-up (provided as part of functionality in the network switch that maintains forwarding table 100) also derives the security group identifier for the packet by looking up the packet's contents in the forwarding table. Alternatively, the switch's layer 2 learning look-up can be designed to extract the security group identifier from the packet itself. This security group identifier is used to tag the packet for identification as having been generated by a user in the given security group. Such a tag is referred to herein as a source group tag (SGT). The SGI is inserted into the packet for use in the subsequent processing of the packet. For example, the SGI can be inserted into the layer 2 header, making such information available to layer 3 routers, as well as layer 2 switches.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Before the appropriate RBACL can be applied, a determination is also made as to the destination security group. While a number of mechanisms can be used to make such a determination, two ways to determine the DSG of the object (server) are now discussed. As will be appreciated, each has its own advantages in certain scenarios.

The first mechanism to determine a DSG employs information in the forwarding information base (FIB) provided during address resolution by the address resolution protocol (ARP) (i.e., the IP FIB). For most cases involving network traffic using IP, the destination security group can be derived from the FIB. On the egress network layer 3 (L3) edge of the network, the FIB will be populated with the resolved host prefix after ARP resolution is performed. Since the ARP response is the trigger for the FIB entry update and needs to be received before any traffic flows to the host, the ARP response is used as the trigger to insert information regarding the destination's security group into the FIB entry.

Alternatively, the destination security group can be determined via a static ingress ACL. As will be appreciated, when connecting an RBACL-enabled network to a non-RBACL-enabled network, the authentication infrastructure will not be present in the non-RBACL-enabled network. In a manner similar to assigning the source security group described previously, the destination security group needs to be classified via the same mechanism in such situations. By using the ingress ACL to provide the destination security group classification, the destination IP addresses/sub-nets can indicate the destination security group to determine the correct RBACL to apply. It will be noted that the egress ACL may also be used, so long as the DSG determination occurs before the RBACL enforcement.

An Example of a Software-Based Permissions Architecture

Figure 2:
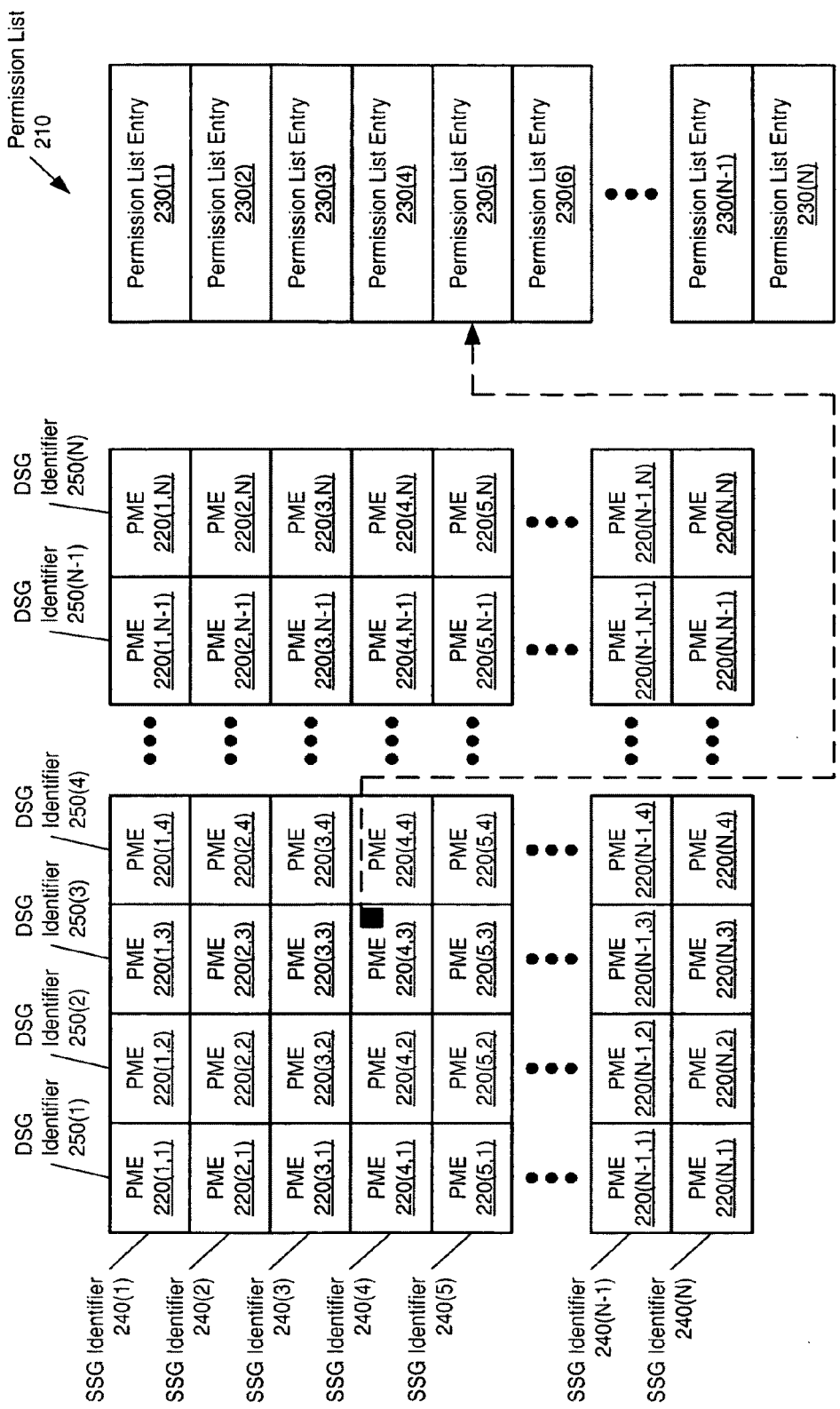
FIG. 2 is a block diagram illustrating a permissions matrix according to embodiments of the present invention.

FIG. 2 is a block diagram illustrating a permissions matrix 200 and a permission list 210, according to the present invention. Each of the entries in permissions matrix 200 (depicted as permissions matrix entries 220(1,1)-(N,N)) point to one of the entries in permission list 210 (depicted as permission list entries 230(1)-(N)). Each of permissions matrix entries (PME) 220(1,1)-(N,N) is indexed by one of a number of source security group identifiers 240(1)-(N) and one of a number of destination security group (DSG) identifiers 250(1)-(N). As will be apparent, each of source security group (SSG) identifiers 240(1)-(N) corresponds to a row in permissions matrix 200, while each of destination security group identifiers 250(1)-(N) corresponds to a column in permissions matrix 200. Each of permission list entries 230(1)-(N) provides a list of permissions as to the kinds of network traffic that are permitted between the source security group and destination security group. For example, given a source security group identifier of four (4) and a destination security group identifier of three (3), PME 220(4,3) is identified. PME 220(4,3) includes a pointer to permission list entry 230(5). Examples of permission lists and data structures therefor are given in patent application Ser. No. 10/659,614, entitled "Method and Apparatus for Providing Network Security Using Role-Based Access Control," as previously included by reference herein.

Thus, in a software based implementation, a tree-based, hash-based, or other such lookup structure can be employed, with the lookup being a match on the concatenation of the source and destination security groups. The result of the lookup is a pointer to a chain of ACLs. These ACLs are traversed in the order they are present in the chain. The ACLs are viewed logically as a single chained ACL.

In many ACL implementations, two approaches are typically employed. One approach is the network processor-based (software) model. This type of implementation is similar to the software implementation and may benefit from that approach. The other approach is using a CAM-based solution. The following section focuses on the CAM-based implementation.

An Example of a Hardware-Based Permissions Architecture Implemented Using Role-Based Access Control Lists A CAM-based implementation provides the advantage of a parallel lookup and the ability to mask fields. Parallel lookup provides high, predictable, and consistent performance. Unfortunately, the single lookup generally creates a significant amount of complexity for software programming of the device, because the typical implementation assumes sequential processing.

The permission matrix can also be implemented in an ASIC using on-chip memory, although it is preferable that the number of groups supported by a platform be relatively small (e.g., less than 256). In such a scenario, the output of the matrix provides a label (e.g., a flow label) which can then be used to perform a CAM lookup in a manner similar to that of traditional CAM-based ACL implementations. The likely case, however, is that the number of groups to be supported will be much larger, making an on-chip implementation infeasible. The permissions determination and permissions enforcement are thus typically implemented together within the CAM lookup itself. Using a single flow label for the RBACL lookup, the source and destination groups can be placed in the CAM flow specification in the place of the source and destination network addresses (e.g., IP addresses).

FIG. 3 is a block diagram illustrating an example of an access control list (ACL) according to the present invention, and depicted as access control list 300. Access control list 300 includes a number of entries (referred to as access control list entries or ACEs), which are depicted in FIG. 3 as access control list entries 310(1)-(N). Each of ACEs 310(1)-(N) include, for example, a flow label (depicted in FIG. 3 as flow label fields 320(1)-(N)), a source security group (SSG) identifier (depicted in FIG. 3 as SSG fields 330(1)-(N)), a destination security group (DSG) identifier (depicted in FIG. 3 as DSG fields 340(1)-(N)), and other flow specifications (depicted in FIG. 3 as other flow specification fields 350(1)-(N)). As is known, an ACL such as ACL 300 can be implemented using a content-addressable memory (CAM), and more specifically, a ternary CAM (TCAM), thereby providing for the fast and efficient look-up of information. An optional flow label (also referred to as an ACL label, maintained in the appropriate one of flow label fields 320(1)-(N)) is provided to distinguish RBACLs from traditional interface ACLs in the same device. A device employing only RBACLs would not need such a field.

An Example of a Network Employing RBACLs

Figure 4:
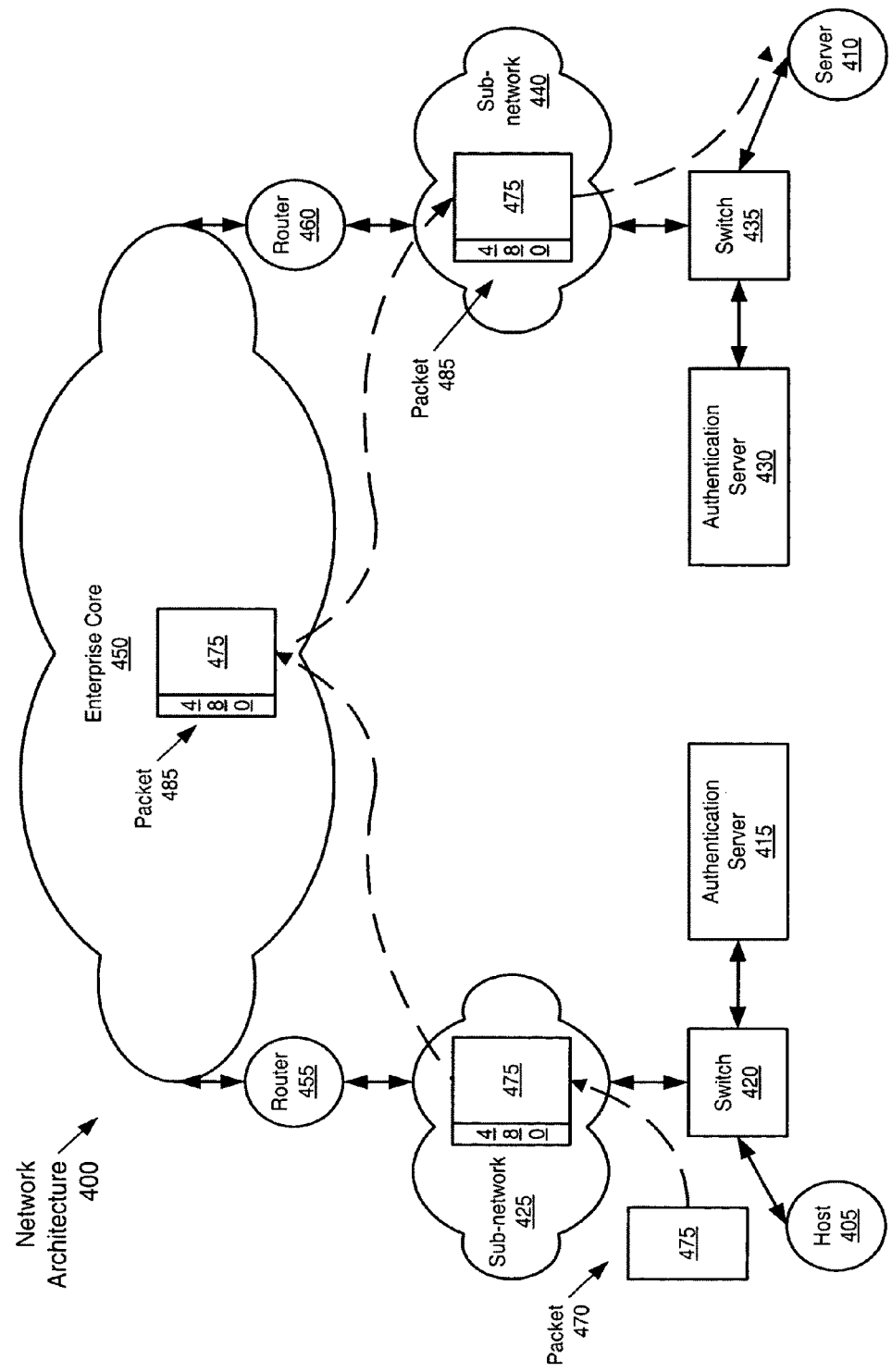
FIG. 4 is a block diagram illustrating an example of a network architecture including a host and a server, according to embodiments of the present invention.

FIG. 4 is a block diagram illustrating an example of a network architecture 400 that includes a host 405 and a server 410. Host 405 is authenticated by an authentication server 415 via a switch 420, in the manner discussed in patent application Ser. No. 10/659,614, entitled "Method and Apparatus for Providing Network Security Using Role-Based Access Control," as previously included by reference herein. Switch 420 also provides host 405 access to a sub-net 425. Server 410 is authenticated by an authentication server 430 via a switch 435, again in the manner discussed in patent application Ser. No. 10/659,614, entitled "Method and Apparatus for Providing Network Security Using Role-Based Access Control," as previously included by reference herein. Switch 435 also provides server 410 access to (and from) a sub-net 440. Sub-nets 425 and 440 are communicatively coupled to one another via an enterprise core 450. Sub-net 425 accesses enterprise core 450 via a router 455, and similarly, sub-net 440 access enterprise core 450 via a router 460.

Also shown in FIG. 4 is a packet 470, having contents 475. Packet 470 is transmitted by host 405 to switch 420. Source security group information is added to packet 470 by switch 420 in the form of a source group tag 480, based on information provided by authentication server 415 during the authentication process, in order to create a packet 485. As is depicted in FIG. 4, packet 485 includes both contents 475 and SGT 480. Packet 485 traverses sub-net 425 and arrives at router 455. Router 455 routes packet 485 across enterprise core 450 to router 460. Router 460 presents packet 485 to switch 435 (and thus, server 410) via sub-net 440. Switch 435 makes a determination as to whether to pass packet 485 to server 410 based, at least in part, on the DSG information provided to server 410 by authentication server 430. It will be appreciated that, alternatively, router 460 could also be tasked with, and make, this determination.

A specific example of the traversal of network architecture 400 by packet 470/packet 485 is now given. After authentication, host 405 can send packets (e.g., packet 470) on the network. Since RBACLs are being applied at network layer 3 in the present example, any packets the user attempts to send beyond his local sub-net (e.g., sub-net 425) will be subject to RBACL inspection. As will be appreciated, switches 420 and 435 can also employ RBACLs in the layer 2 domain (e.g., within sub-nets 425 and 440, respectively).

If packet 485 is the first packet to be sent from host 405 to server 410, an ARP process will be triggered for the destination. The sending of packet 485 begins with the SSG (in this case, with a value of 5) being taken from SGT 480. A FIB lookup in router 455 for a packet has the destination of packet 485 indicates the next hop router to which the packet should be forwarded. This Next Hop Information could be, for example, either the MAC rewrite information for router 460, or that for a router between router 455 and router 460. It will be noted that, in this example, the prefix information is contained in a CAM, while the security group and next hop information are contained in a standard memory (e.g., SRAM). The lookup is performed by using the prefix to determine which entry in memory to inspect.

When packet 475 (later packet 485) is sent from host 405, packet 475 is untagged, as noted. In this example, upon entering switch 420, packet 475 is tagged with SGT 480 (which indicates a security group of 5). This security group is retrieved from the layer 2 table in the ingress switch (switch 420) in the manner discussed previously. This packet (which is, now including SGT 480, referred to as packet 485) is then sent through network architecture 400 via the routing and switching provided thereby.

At the egress router (router 460), FIB lookup is performed. If the FIB lookup hits a locally-attached sub-net, the glean adjacency causes an ARP request to be generated for the desired server (e.g., server 410). The ARP request is sent from router 460 to server 410. The ARP response is then sent from server 410. The ingress L2 switch (switch 440) inserts the SSG for server 410 (or, as used by the switches/routers of network architecture 400 (e.g., host 405) as the DSG for packets sent to server 410; which is set to a security group of 6) into the ARP response (in the L2 header). Router 460 receives the ARP response and populates the FIB with the resolved host prefix, the rewrite information containing the MAC address of the host, and the destination security group (6) from the ARP response.

In the case where packet 485 is a subsequent packet from host 405 to server 410, the tables in question should already be populated. Once the FIB of router 460 contains the fully resolved host prefix, the next packet to server 410 will be subject to access control. (In the embodiment of the present invention in this example, the first packet that triggered the ARP resolution is dropped.) When the subsequent packet arrives from host 405 arrives at router 460, router 460 already possesses the information relating to the pertinent source and destination groups. The SSG (5) is extracted from the subsequent packet's SGT and the DSG (6) is discovered by the FIB lookup.

At this point, an ACL lookup can be performed. Assuming a CAM-based implementation is employed, the lookup key into the CAM contains the packet information as well as the source and destination security groups (5 and 6). In this example, the only allowed permission between the 2 groups is web traffic (tcp port 80). As will be appreciated, it is desirable to perform this access control processing earlier in the route of a packet being conveyed through the network. Such functionality is described below in connection with FIGS. 8, 9, 10, 11 and 12 below.

Since, in this example, the subsequent packet is indeed web traffic (destined for TCP port 80), the appropriate CAM entry is hit and transmission of the packet to sub-net 440 (and so, on to server 410 via switch 435) is permitted. However, to illustrate further, if the subsequent packet had been a Telnet packet (destined for TCP port 23), the packet would hit the ANY-ANY entry in the CAM, which would not permit such transmission (effectively implementing the implicit deny present in software ACLs). A more generalized discussion of the operations described in the preceding passages is now presented in connection with FIGS. 5, 6, and 7.

An Example of the Operation of a Network Employing RBACLs

Figure 5:
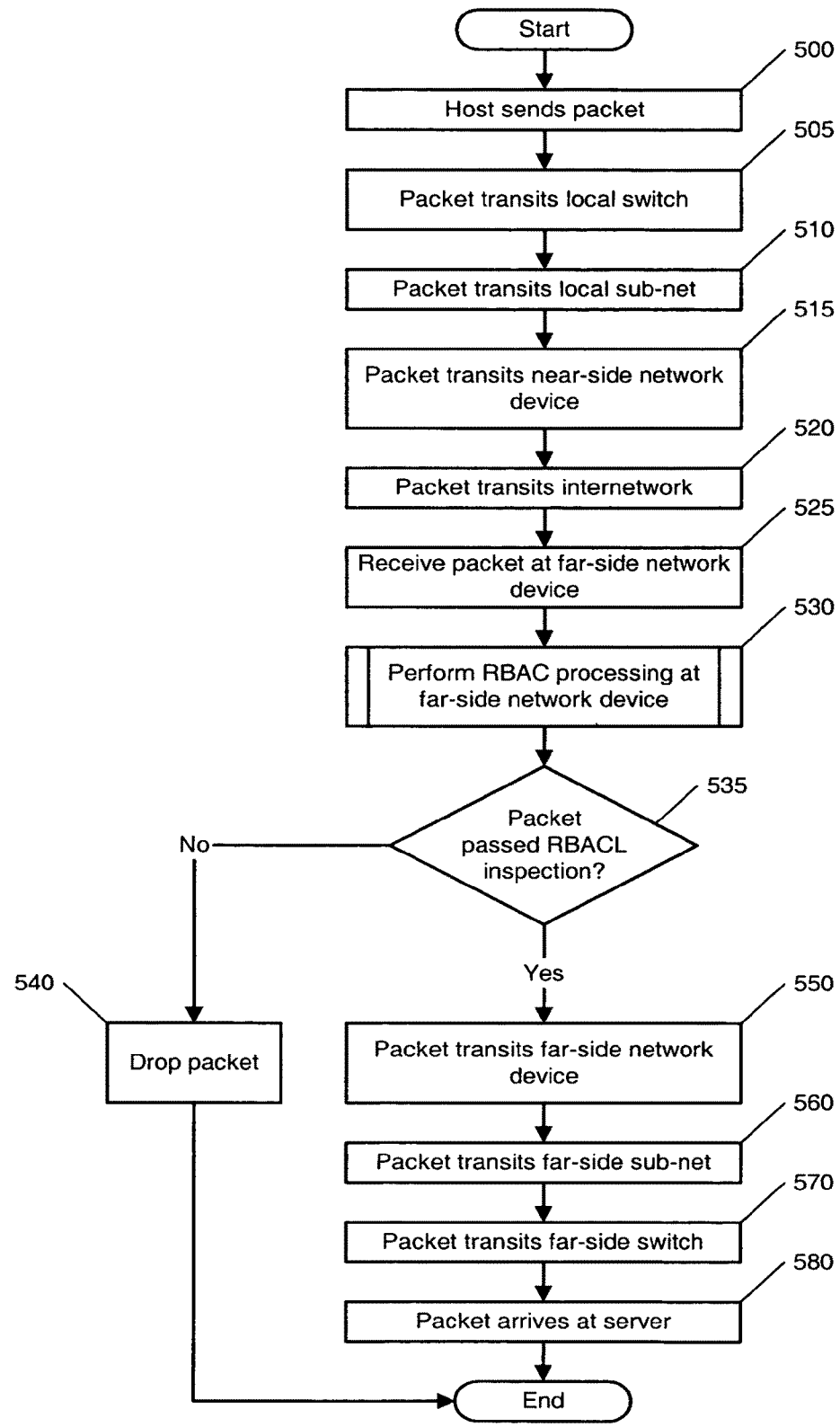
FIG. 5 is a flow diagram illustrating an example of a packet's traversal through the network architecture shown in FIG. 4 and processing performed thereon according to embodiments of the present invention.

FIG. 5 is a flow diagram illustrating a generalized example of the process of a packet's traversal through a network such as that depicted as network architecture 400. In such a scenario, the process begins with host 405 sending a packet (e.g., packet 470) (step 500). The packet thus transmitted transits the local switch (e.g., switch 420), which tags the packet with source security group information (e.g., an SGT) (step 505). The target packet (e.g., packet 485) then transits the local sub-net (e.g., sub-net 425) (step 510). After transiting the local sub-net, the packet transits the near-side network device (e.g., router 455) (step 515). At this point, as noted, router 455 routes the packet across the given internetwork (e.g., enterprise core 450) (step 520). After transiting the internetwork, the packet is received by the far-side network device (e.g., router 455) (step 525). At the far-side network device, role-based access control processing is performed (step 530). Such processing is described in detail in connection with FIGS. 6 and 7.

A determination is then made as to whether the given packet has passed the RBAC processing that is performed (step 535). If the packet fails to pass the RBAC inspection (i.e., the RBAC processing that was performed), the packet is dropped (step 540). As will be apparent to those skilled in the art, other actions may be performed in response to such an outcome. Alternatively, if the given packet passes RBAC inspection (step 535), the packet is allowed to transit the far-side network device (step 550), and then transits the far-side sub-net (e.g., sub-net 440) (step 560). The packet then transits the far-side switch (e.g., switch 435) (step 570). Finally, the packet arrives at the destination server (e.g., server 410) (step 580).

As noted, FIG. 5 depicts a flow diagram illustrating a process according to an embodiment of the present invention, as do other of the flow diagrams discussed herein. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. Optical storage media such as compact disk media (e.g., CD-ROM, CD-R, etc.) and digital video disk storage media nonvolatile memory storage memory including semiconductor-based memory units such as FLASH memory, EEPROM, EPROM, ROM or application specific integrated circuits. Volatile storage media including registers, buffers or caches, main memory, RAM, and the like, and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 6:
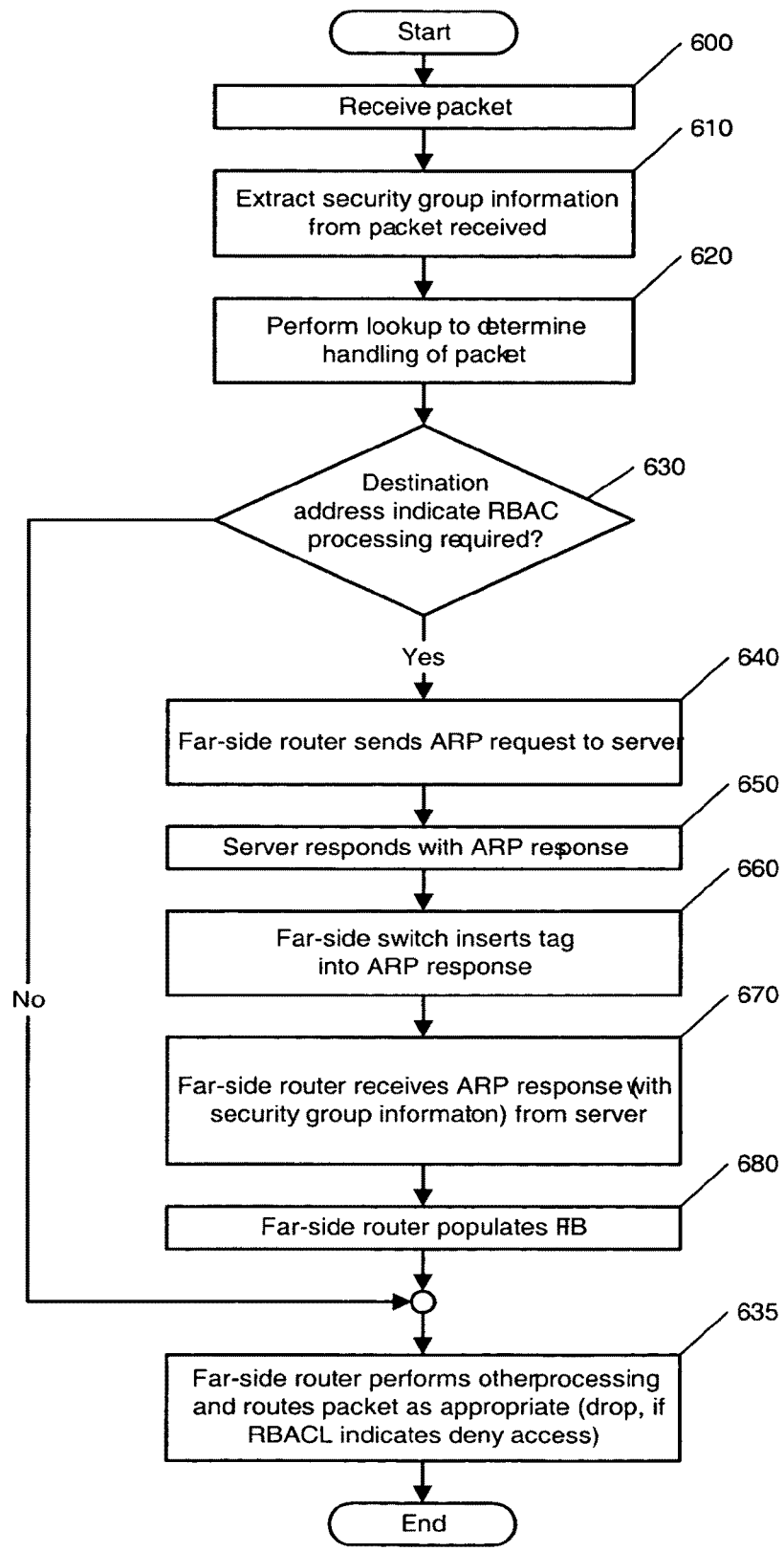
FIG. 6 is a flow diagram illustrating an example of processing performed on a packet subject to role-based access control (RBAC) processing according to embodiments of the present invention, where the packet is the first such packet received.

FIG. 6 is a flow diagram illustrating an example of the RBAC processing performed on the packet by a network device such as router 460, in the case in which the packet is the first such packet received. The process begins with the receipt of a packet to be processed using the present invention (step 600). First, the packet's SGT is extracted (step 610). Next, a look-up is performed to determine how the packet should be handled (step 620). A determination is then made as to whether the destination address of the given packet indicates that RBAC processing is required (step 630). If the destination address indicates that RBAC processing is not required, the far-side router performs other processing on the packet, as required, and routes the packet as appropriate (step 635).

However, if the packet's destination address indicates that RBAC processing is to be performed, the far-side router sends an address resolution protocol (ARP) request to the destination server (e.g., server 410) (step 640). The server responds with an ARP response (step 650). Next, the far-side switch inserts the DGT (or SGT, from the perspective of server 410) corresponding to the server's group, into the ARP response (step 660). The far-side router receives this ARP response (including the DGT (or SGT, from the perspective of server 410) indicating the DSG of server 410) (step 670)), and populates its forwarding information base (FIB) with this information (step 680). As before, the far-side router then performs any other processing required, and routes the packet as appropriate (step 635). It will be noted that, in fact, this routing may include dropping the given packet if the RBACL indicates that the network device is to deny access to the packet.

Figure 7:
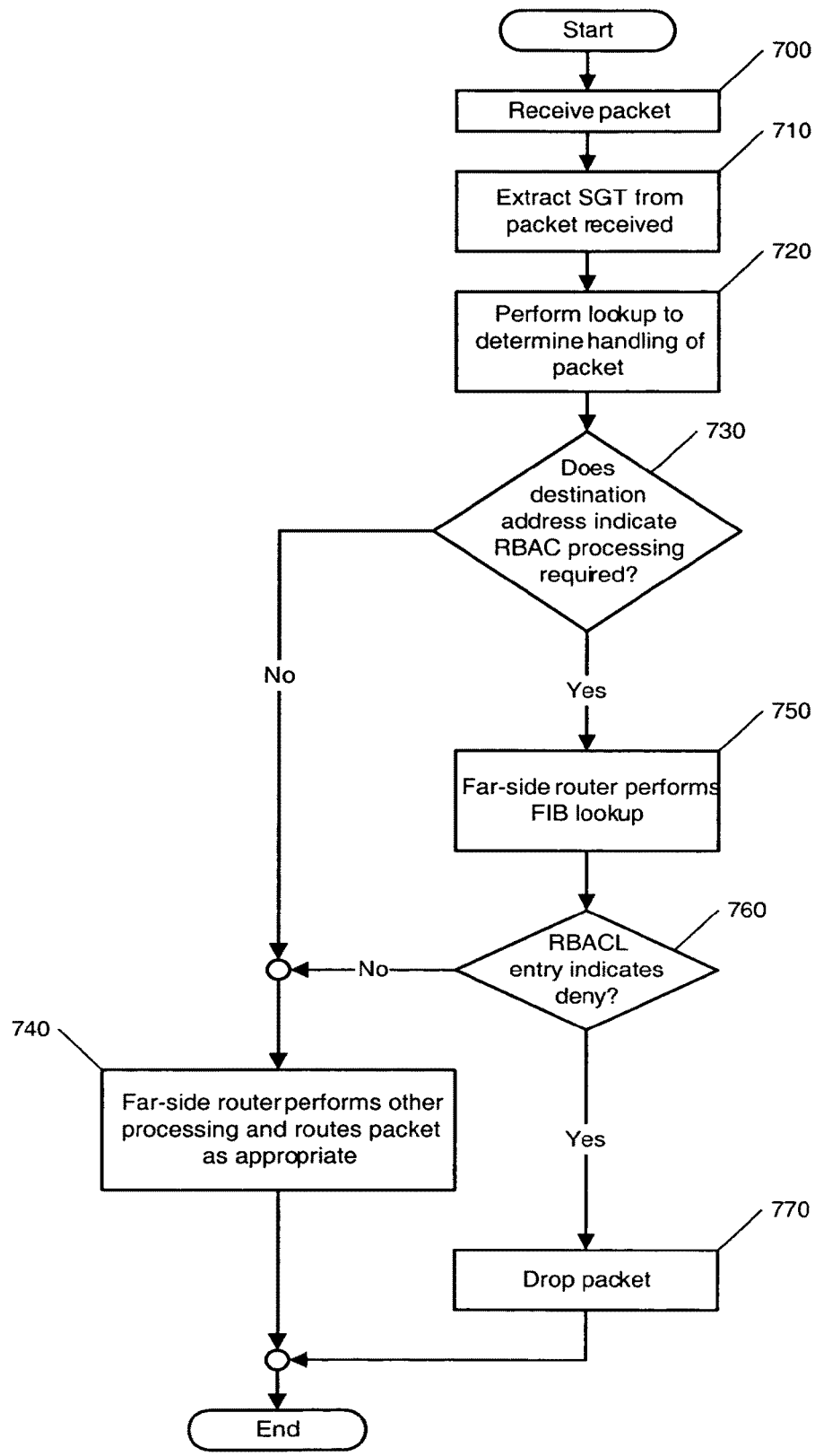
FIG. 7 is a flow diagram illustrating an example of processing performed on a subsequently-received packet subject to role-based access control (RBAC) processing according to embodiments of the present invention.

FIG. 7 is flow diagram illustrating an example of processing performed on a packet received subsequently to that of FIG. 6, while still subject to RBAC processing according to the present invention. The process begins, as before, with receipt of the given packet (step 700). Also as before, the packet's SGT is extracted (step 710). A look-up is performed by the network device (e.g., router 460), in order to determine how the given packet is to be handled (step 720). A determination is then made as to whether the packet's destination address indicates that RBAC processing is required (step 730). If the packet's destination address does not indicate that RBAC processing is required, the far-side network device performs other processing as necessary, and routes the packet appropriately (step 740).

However, if the far-side network device determines that the packet's destination address indicates that RBAC processing is required, the far-side network device performs a forwarding information base (FIB) look-up to determine the DSG (step 750). The far-side network device, during egress ACL processing, then makes a determination as to whether the RBACL entry indicates that the given packet should be denied (step 760). If the RBACL entry indicates that the packet should be denied, the packet is dropped (step 770). Alternatively, if the RBACL entry indicates that the packet should be forwarded, the far-side network device performs other processing as necessary and routes the given packet as appropriate (step 740).

An Example Implementation of Security Group Propagation to an Ingress Node

As noted earlier, while the techniques mentioned above provide a number of desirable advantages, such an approach performs access control at the egress node, which mandates that a packet traverse the network before performing access control on the packet. While this approach is conceptually simple, requiring only that the information needed to perform such analysis be aggregated at the egress node, the need to send the packet to the egress node also results in such packets having to be conveyed over the network. This can result in the network carrying traffic unnecessarily, in that such traffic may ultimately be denied at the egress node. As noted earlier, an approach that performs such access control at the ingress node is therefore desirable, in order to reduce network traffic. Moreover, such an approach also reduces the susceptibility of a network employing such an approach to denial-of-service (DOS) attacks by applying access controls early in a packet's traversal of the network, among other such advantages.

In order to provide these advantages, a method and system of the present invention can be employed to propagate information needed to perform access control processing to the ingress node. In one embodiment of the present invention, this approach propagates security group information from the egress node to the ingress node upon the denial of a packet. This allows packets, which will ultimately be denied, being denied at their respective ingress node (and performing access control at the egress node, for packets that will ultimately be allowed). This avoids packets being conveyed across the network, only to be denied at their respective egress nodes.

It will be appreciated that the processes described in preceding sections of the present application can be used in the context of the present invention, including assigning security groups, acquiring security group information, taking certain actions with regard to conveying packets across the network, and the like. In particular, as will be noted with regard to the figures described subsequently, the primary differences become evident at the point at which a packet is denied at the egress node, with the present invention's ability to then propagate that information to the denied packet's ingress node. As will be appreciated, while an implementation of the present invention can also comprehend conveying security group information to the ingress node for packets permitted at the egress node, the greatest benefit is the situation in which the packets in question are to be denied, because the unnecessary conveyance of packets is avoided in the latter situation. However, it will also be appreciated that, depending on the network devices' architectures, it may be more efficient to perform the requisite access control processing at the ingress node for both packets to be denied and permitted, so that such processing is performed at a single point in the network.

In one embodiment, the first packet traversing the network from a source to a destination is used to determine security group information. For this first packet, this portion of the process is similar to that of the process described in earlier sections of this disclosure. Once this first packet reaches its egress node, the packet's receipt triggers a process by which information regarding the destination's security group and address is determined. For example, this information can be obtained from the destination, from network nodes within the sub-network to which the network node is attached, from information stored at the network node or the like. Once this information has been determined, the relationship between the destination's security group and address can be made known to the ingress node. This allows access control processing, which is performed at the egress node using the process described previously, to be performed at the packet's ingress node. Access control processing can then be performed on subsequent packets sent from the given host to the server in question at the ingress node, rather than waiting until such packets reach the egress node.

As noted earlier, this approach is particularly advantageous in the situation in which the access control processing results in the denial of packets destined for a given destination, as the sooner a packet is denied, the less unnecessary traffic the network is forced to carry. Moreover, such an approach is able to more quickly prevent the spread of malicious packets. A network employing such an approach is thus able to enjoy the aforementioned benefits provided by the present invention. Such a process is also typically employed in the situation in which a packet is to be permitted, as a permitted packet will simply be conveyed to the egress node regardless of the point at which access control processing is performed on the packet. Such is typically the case because distinguishing between permits and denies involves unnecessarily complicates the processing of packets, and provides little benefit (given that permitted packets will be conveyed to the egress node in either case). Thus, early access control processing in the case of permitted packets may not offer quite the same advantages as are provided in the case of denied packets. However, while the efficiency of having a single point for access control processing for both denied and permitted packets may be desired, conveying information regarding denials and permissions to the ingress node may dictate the use of different mechanisms. As will also be appreciated, however, the implementations presented herein are but examples of the present invention, and other embodiments will be apparent to one of skill in the art, in light of the disclosure provided herein. Such alternatives are intended to come within the scope of the claims appended hereto.

In one embodiment, the preceding objectives are met through the use of security groups such as those presented earlier herein. Security group information is made available through the authentication process (e.g., a security group identifier), which can be from an authentication server, for example. Upon authentication (e.g., of a host or server in a sub-network), this security group information is made available to a network node that couples the sub-network to a core network. In the manner previously described, upon receipt of a first packet from a given source to a given destination (e.g., from a host to a server) at the packet's egress node, this security group information is passed to the packet's ingress node. Propagating this information to the packet's ingress node provides the ingress node with the information needed to perform access control processing on such packets.

Figure 8:
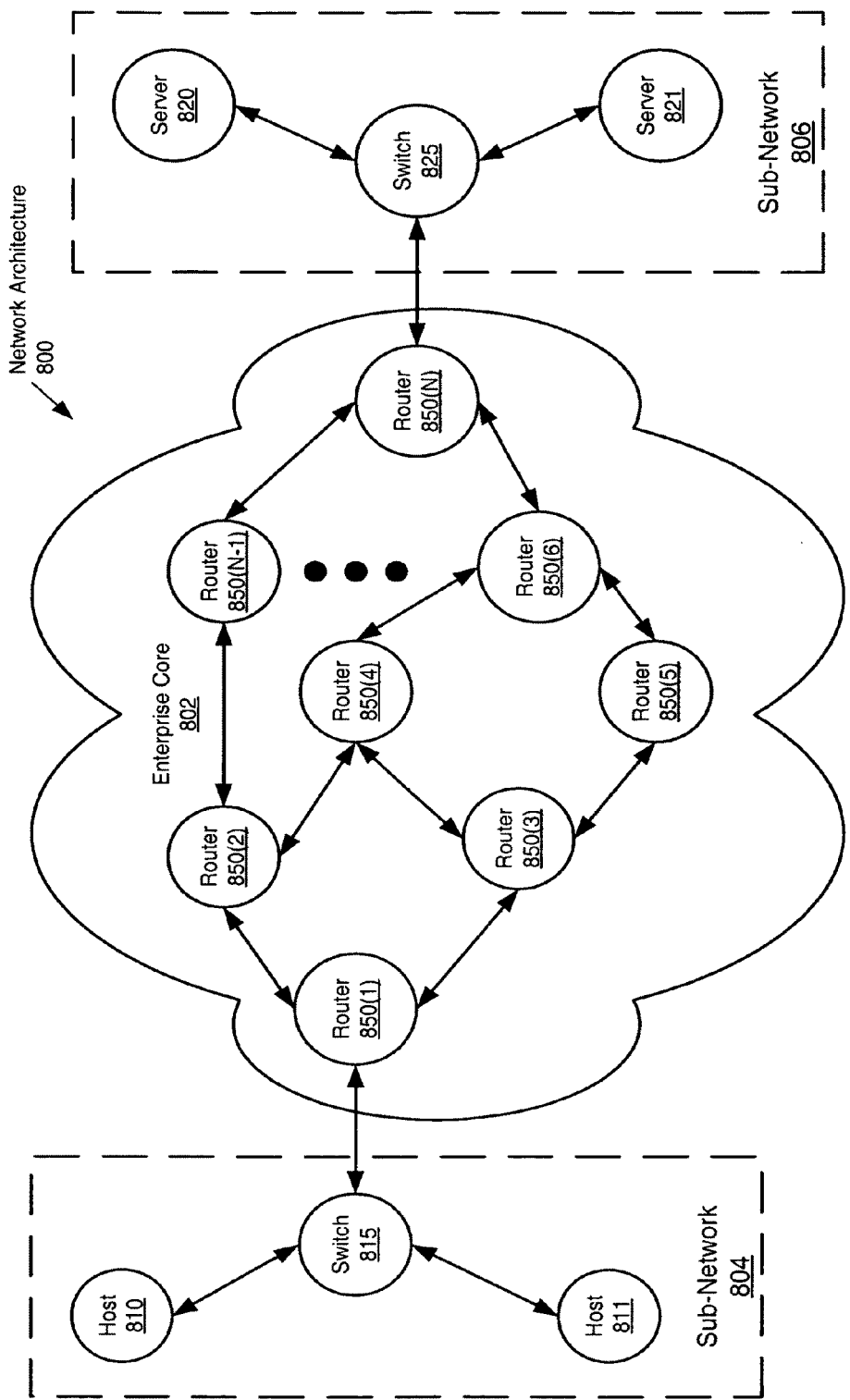
FIG. 8 is a diagram illustrating an example of a network architecture, including hosts and servers, in which the present invention can be practiced.

FIG. 8 is a block diagram illustrating an example of a network architecture 800 in which the present invention can be practiced. As can be seen, network architecture 800 includes an enterprise core network 802, which couples to sub-networks 804 and 806 to one another. Sub-network 804 includes hosts 810 and 811, which are coupled to enterprise core network 802 via a switch 815. Similarly, sub-network 806 includes servers 820 and 821, which are coupled to enterprise core network 802 via a switch 825. Hosts 810 and 811 thus communicate with servers 820 and 821 via enterprise core network 802. Enterprise core network 802 includes a number of network devices, but for the sake of simplicity, is shown as including a number of routers (depicted in FIG. 8 as routers 850(1)-(N)), variously interconnected to one another. As will be appreciated, although enterprise core network 802 is depicted as including only routers 850(1)-(N), enterprise core network 802 can include a variety of other kinds of network devices, depending on the network protocols and architectures supported thereby.

In the context of network architecture 800, as a packet is sourced (e.g., from host 810, via switch 815, to router 850(1)) and traverses enterprise core 802, security group information (e.g., a source group tag) is carried along with the other information in the packet. At the egress edge of enterprise core 802 (e.g., router 850(N)), the destination group of the packet's destination (e.g., server 821) is determined. For example, the destination group can be derived from the forwarding information base (FIB) of router 850(N) via the fully resolved host prefix. The host prefix is resolved through the address resolution protocol (ARP). The ARP response is tagged with the destination's security group information when the response is sourced onto the network. The FIB result is populated with the destination group in addition to the rewrite information. Once the source and destination groups have been determined, the permissions (the relevant ACL entry) can be determined by the egress node (e.g., router 850(N)).

However, as noted, making this determination at the ingress node is desirable for a number of reasons. To propagate the security group information to the ingress node in the case of a denial, one embodiment of the present invention provides mechanisms that propagate group membership information from the packet's egress node to the packet's ingress node by including security group information with messages generated as result of the denial. For example, the ICMP protocol (of the OSI model) can be modified to allow for the propagation of security group information (e.g., a security group identifier (SGI) such as a security group tag (SGT)), along with route update information, as part of the operation of the protocol.

In a system of the present invention, such a process can be performed as follows, for example. Once a packet has been subjected to access control processing at an egress node, the packet may be permitted, or may be denied. In a system of the present invention, a determination resulting in a packet's denial also results in certain information being propagated to the packet's ingress node. For example, when using the internet control message protocol (ICMP), if a packet is denied, information regarding the denial can be included in the ICMP packet sent to the ingress node to inform the ingress node of the denial (e.g., using an ICMP Destination Unreachable message). In a system of the present invention, such information can include:

Dst IP addr—Denied packet's Source internet protocol (IP) address

Src IP addr—Denied packet's Destination internet protocol (IP) address

SGI—SGI of the Denied packet's destination

This control packet (e.g., an ICMP Destination Unreachable message) flows through the network towards ingress node. Intermediate network nodes do not know the control packet's destination group, so each such node simply generates the packet's membership as the group "unresolved", which permits packet. The packet's SGI is thus retained.

Once the control packet reaches the ingress node, the destination group can be resolved, and so the packet's membership is no longer the "unresolved" group. After this determination has been made, the packet is redirected, via access control processing in the ingress node, to allow for the association of the address of the original packet's destination and that destination's security group identifier. This association between the destination's address and its security group identifier is referred to herein as a binding. Upon receipt by the ingress node, this association can be effected, for example, through the use of a table that allows such information to be stored as an entry in the table or database. The access control entry to initiate such processing can be, for example, "ICMP Unreachable && Dest Group=Unresolved Group" or the like. It will be appreciated that the destination security group, in this case, is actually that of the source of the original packet.

At this point, a binding can be created. For example, an entry can be installed in a database used for monitoring network traffic in the ingress node. Typically, this will be a destination-only entry, as the traffic to be processed using this entry will only be that from the source to the destination (and not the reverse). This entry will use the source IP address of the control packet (i.e., the ICMP Destination Unreachable message) as the destination IP address to be filtered. This binding is created by assigning the destination's security group identifier, which is gleaned from the SGI in the ICMP Destination Unreachable message, to the destination's address.

Once such a binding is created, the binding can be used to perform ingress filtering and access control enforcement.

Thus, subsequent packets from a given source (e.g., a host) derive their source security group information in the manner such as that described in patent application Ser. No. 10/659,614, entitled "Method and Apparatus for Providing Network Security Using Role-Based Access Control," as previously included by reference herein. The security group of the packet's destination is also determined, using the ingress node's FIB and/or ACL, with the binding providing the destination's security group information. In one embodiment, the lookup of the destination's security group information is performed prior to egress ACL enforcement in ingress node. Once the destination's security group information is known, RBACL enforcement can be performed. In certain embodiments, if any of the three (FIB, ACL or binding) indicate a result other than the default destination group, priority bits can be examined to determine which destination group to honor. If the table or other structure used to maintain the bindings becomes full, entry insertion can consider age of the entry, last usage, packet counts, and the like to determine which entry (if any) is to be replaced.

In an alternative embodiment, the control packet (e.g., ICMP Destination Unreachable message) can be redirected for further processing. In such an embodiment, the receipt of such a control packet causes the control packet's information to be routed to the node's processor for further processing. This further processing can include installation via software into the binding table or FIB. It is assumed here that such processing is performed when the destination group is known. Preferably, such processing is subject to rate limiting, to prevent the node from being overwhelmed with such tasks.

In certain embodiments of the present invention, the ingress node's control plane can make use of enhancements provided by the use of RBACLs. In certain implementations supporting the use of RBACLs, a complete permissions matrix (also referred to herein as an access control matrix) is downloaded (e.g., to the network node to which the host seeking authentication is coupled), when the host is authenticated. This results in the ACLs (RBACLs) represented by the permissions matrix' entries (e.g., a complete permissions list) also being downloaded. Alternatively, the permissions list can simply be maintained on the network node, for use by the various hosts coupled thereto.

Alternatively, certain implementations supporting the use of RBACLs download only the column of the permissions matrix (which is indexed by the destination's security group) corresponding to the security group of the entity being authenticated. This approach can be used in systems implementing egress node processing, for example. Thus, only a portion of the permissions matrix need be downloaded, minimizing the amount of data that needs to be downloaded (e.g., from the authentication server to the network node coupled to the host being authenticated). Moreover, in certain implementations, only a portion of the permissions list need be downloaded. However, in other implementations, it may be more convenient to simply download the entire permissions list, rather than doing so piecemeal. Downloading the column of the permissions matrix allows access control processing to be performed at the egress node for packets from various sources (source security groups) that have the given host as their destination. A more detailed discussion of the generation and downloading of a permissions matrices and permissions lists can be found in patent application Ser. No. 10/970,532, filed Oct. 21, 2004, and entitled "Method And System For Generating User Group Identifiers," having Michael R. Smith as inventor, which is hereby incorporated by reference herein, in its entirety and for all purposes.

In the case of ingress filtering according to the present invention, access control information is also needed for the possible destination security groups. Thus, in addition to downloading the appropriate column of the permissions matrix, the support of ingress filtering necessitates the downloading of (at least the requisite portions of) the row of the permissions matrix (and those entries corresponding permission lists(s), if necessary). This allows the previously-described determinations to be made with regard to the security groups of the possible destinations of a packet sourced by the given host.

As will be appreciated, the structure(s) used to store the bindings used in implementations of the present invention need to be maintained. As noted earlier, if the table or other structure used to maintain the bindings becomes full, entry insertion that will require removal of one or more entries can consider age of the entry, last usage, packet counts, and the like to determine which entry (if any) is to be replaced. For example, binding table entries can be aged by software using a relatively fast aging interval (e.g., 5 minutes), or a least-recently-used policy can be employed.

In one embodiment of the present invention, client re-authentication is supported. In such a scenario, a client can reauthenticate and be placed in another security group (e.g., a user can login as themselves, then logout, and login again as an administrator). AS will be appreciated, this is less relevant to entities such as servers, which login/logout infrequently and rarely change security groups. Client re-authentication is simplified by the fact that clients almost universally initiate connections. Thus, new connection attempts from a given client are tagged with new security group information. To ensure that the client's security group has not changed, a lookup in the binding table can be performed using the source's IP address and security group identifier. If source IP address results in a security group that does not match the SGI in the packet, the binding table can be changed to reflect the new security group assignment. An alternative to the use of such a lookup scheme is the aging of binding table entries using a sufficiently short interval (e.g., 5 minutes), after which stale entries are available to be over-written.

The present invention provides a number of advantages, including the following, as well as those mentioned earlier. Most importantly, the present invention conserves network resources (e.g., bandwidth, processing resources and the like). This improves the quality-of-service provided by a network of the present invention. Such a network is also less susceptible to distribute denial-of-service attacks, as well as network reconnaissance attacks. The advantages mentioned herein will become more apparent in the following discussion of an example embodiment of the present invention, in connection with FIGS. 9, 10, 11 and 12.

Figure 9:
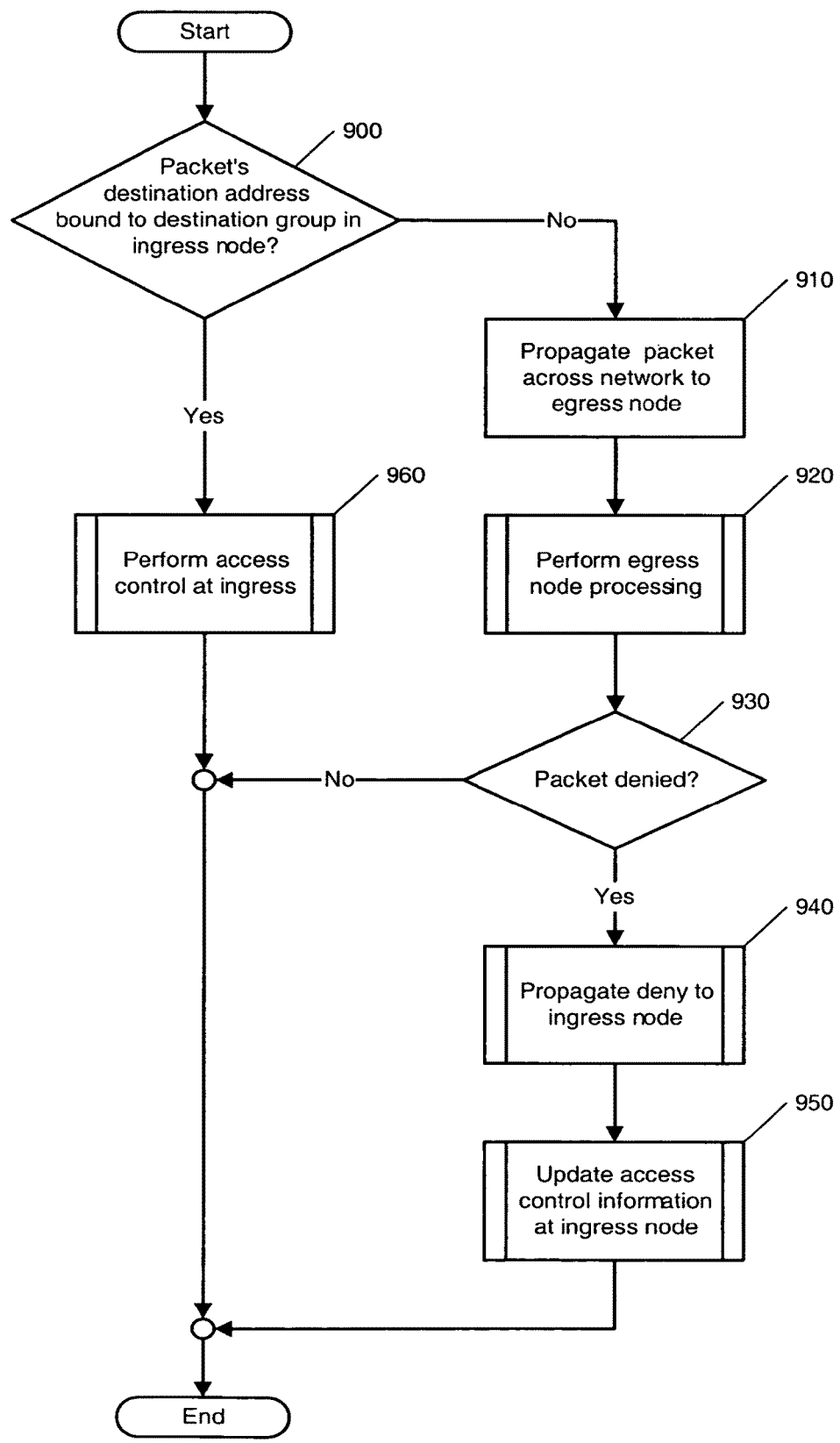
FIG. 9 is a flow diagram illustrating an example of a general process of performing access control according to embodiments of the present invention.

FIG. 9 is a flow diagram illustrating an example of a general process performing access control according to embodiments of the present invention. The process begins with a determination as to whether the destination address of the packet is bound to a destination group in the ingress node (step 900). If the packet's destination address is not bound to a destination group in the ingress node, the packet is propagated across the network to the packet's intended egress node (step 910). Once the packet arrives at the egress node, access control processing is performed on the packet by the egress node (step 920). An example of the access control processing performed at an egress node has been described in connection with FIG. 6, above.

In the embodiment depicted in FIG. 9, a determination has been made as to whether the packet is subject to denial at the egress node (step 930). In this embodiment, if the packet is permitted, no further action is taken. This would be situation if, during the design of an implementation of the present invention, it was decided that access control processing of permitted packets would be performed at the egress node. Thus, in that case, no further action would be taken at the ingress node in the case of a permitted packet, because the ultimate outcome (the packet being permitted) does not change based on where access control is performed (and so the additional overhead of conveying that information to the ingress node may not be warranted). However, if the packet is denied at the egress node (step 930), information regarding the denial is propagated from the egress node to the ingress node (step 940). Such a process is described in further detail in connection with FIG. 10, below.

Next, the access control information having been propagated to the ingress node, the access control information maintained at the ingress node is updated (step 950). The process of updating access control information at the ingress node is described in greater detail in connection with FIG. 11, below.

If the packet's destination address is bound to a destination group in the ingress node, access control processing can be performed at the ingress node (step 960). This provides various advantages, such as those noted earlier. An example process of performing access control at an ingress node is described in connection with FIG. 12, below.

Figure 10:
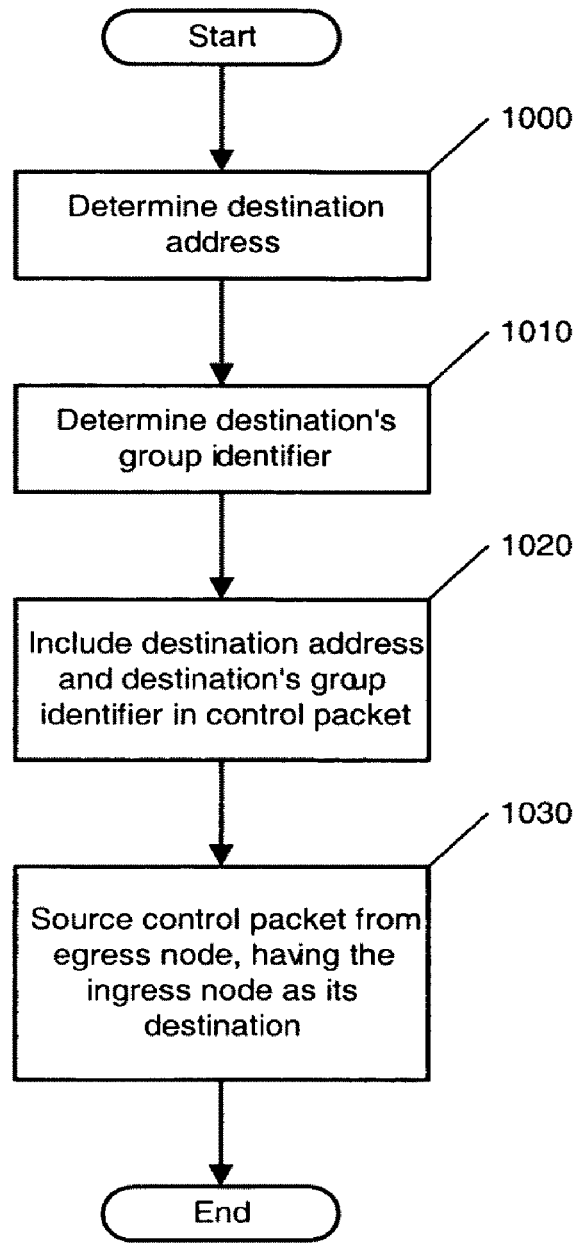
FIG. 10 is a flow diagram illustrating a process for propagating access control information to an ingress node according to embodiments of the present invention.

FIG. 10 is a flow diagram illustrating a process for propagating access control information to an ingress node according to embodiments of the present invention. The process begins with a determination of the destination address of the packet (step 1000). Next, the destination's security group identifier is determined (step 1010). Once the destination's address and security group identifier have been determined, the destination address and the destination's security group identifier are included in a control packet that is to be sent from the egress node to the ingress node (step 1020). Once this information is included in the control packet, the control packet is sourced from the egress node (step 1030). The control packet's destination is the ingress node. The foregoing actions thus propagate information regarding the denial of the packet from the egress node to the ingress node. This can be accomplished in the manner discussed previously, with regard to the use of ICMP Destination Unreachable messages, for example.

Figure 11:
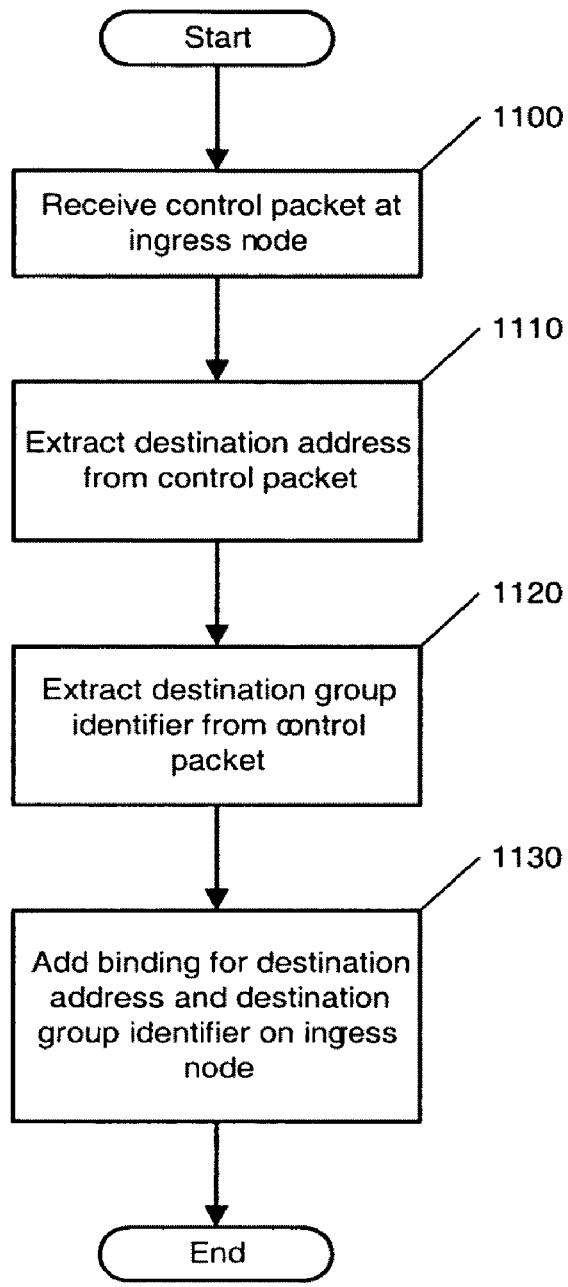
FIG. 11 is a flow diagram illustrating a process for processing access control information at an ingress node according to embodiments of the present invention.

FIG. 11 is a flow diagram illustrating a process for processing access control information at an ingress node according to embodiments of the present invention. The process begins with the receipt of a control packet at the ingress node (step 1100). Once the control packet has been received, information regarding the destination address of the packet giving rise to the control packet can be extracted from the control packet (step 1110). Similarly, the security group identifier of the original packet's destination can also be extracted from the control packet (step 1120). Once the destination address and destination security group identifier have been extracted from the control packet, a binding between the destination address and the destination's security group identifier can be added on the ingress node (step 1130). At this point, the ingress node having received such information is able to perform access control processing for packets destined for the given destination. A process for performing such access control processing is now described in connection with FIG. 12.

Figure 12:
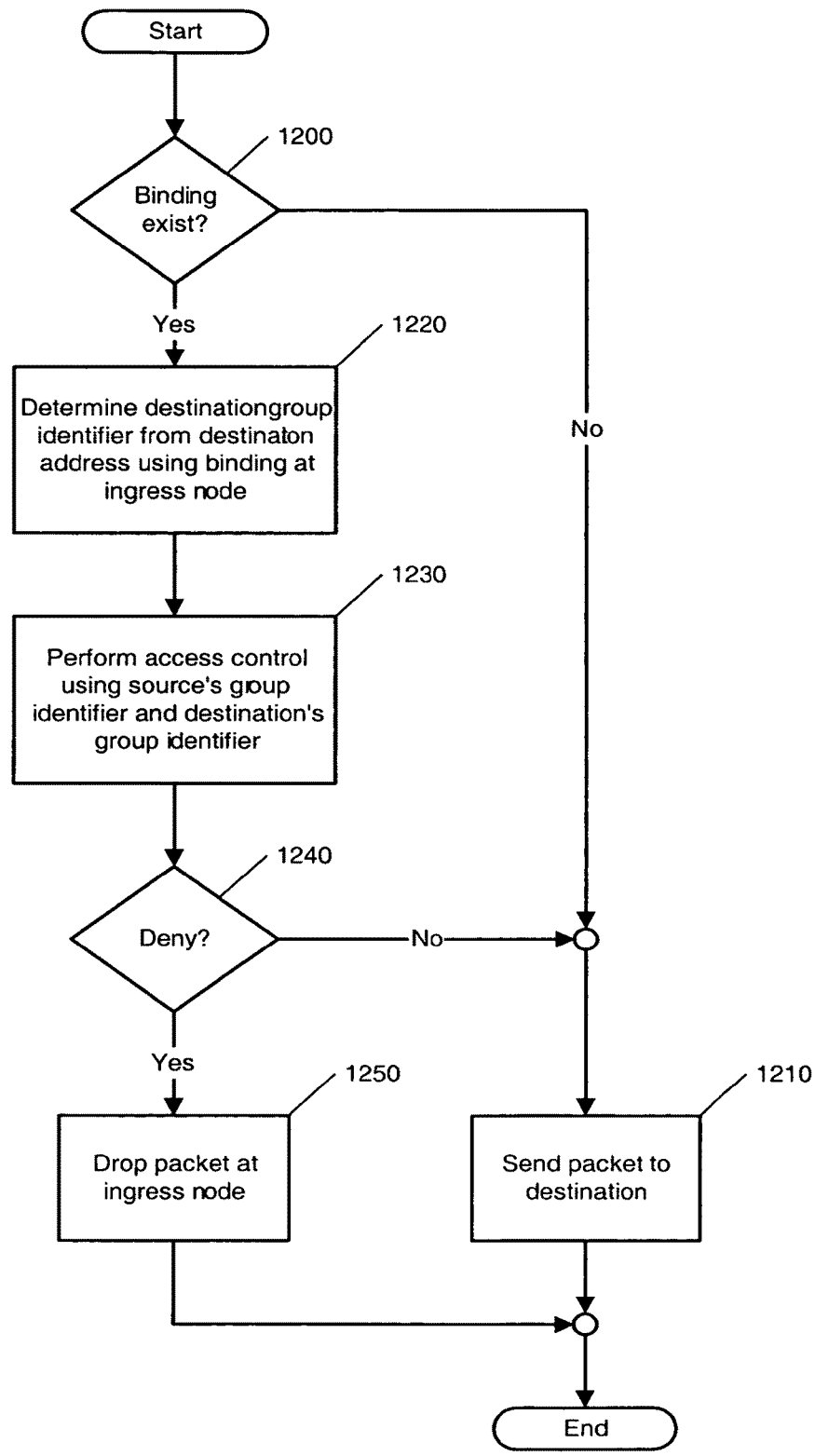
FIG. 12 is a flow diagram illustrating a process for performing access control at an ingress node according to embodiments of the present invention.

FIG. 12 is a flow diagram illustrating a process for performing access control processing at an ingress node according to embodiments of the present invention. The process begins with a determination as to whether a binding between the packet's destination address and a security group identifier (the destination's security group identifier) exists (step 1200). This can be accomplished, for example, by using the destination address as an index into a binding table, to determine if an entry for that destination address exists. If the binding does not exist, the packet is sent to its intended destination (step 1210). The process of initial access control processing and, potentially, propagation of the destination's security group identifier to the ingress node is then performed, in the manner discussed in connection with FIGS. 9, 10 and 11, above.

If such a binding exists, the ingress node uses the binding to determine the destination's security group identifier using the packet's destination address (step 1220). This is done using the binding between the destination address and the destination's security group identifier, as mentioned previously in connection with FIG. 11.

Once the destination's security group identifier has been determined, access control processing is performed using the source's security group identifier and the destination's security group identifier (1230). This processing, performed on the ingress node, is not unlike that which would be performed on the packet's egress node, where the packet to be propagated through the network to the egress node.

A determination is then made as to whether the packet should be denied (step 1240). If the access control processing performed indicates that the packet should be denied, the packet is dropped at the ingress node (step 1250). This provides various advantages noted earlier herein. However, if the access control processing performed does not indicate that the packet should be denied (or, alternatively, no such binding exists at the ingress node), the packet is sent to its intended destination, in order to allow access control processing to be performed at the egress node in a manner such as that described earlier (step 1210).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the scope of this invention. Moreover, while the invention has been particularly shown and described with reference to these specific embodiments, it will be understood by those skilled in the art that the foregoing and other changes in the form and details may be made therein without departing from the scope of the invention.

What is claimed is:

1. A computer-implemented method comprising:
receiving a packet at an ingress node of a network, wherein
said network comprises a plurality of nodes,
said ingress node is one of said plurality of nodes,
said packet is received from a source node communicatively coupled to said network at said ingress node,
said packet comprises
source security group information, and
a destination address,
said destination address is an address of a network node communicatively coupled to said network,
said source security group information identifies a source security group,
said source node is a member of said source security group, and
said network node is a destination of said packet;
extracting said destination address from said packet, using a processor of said ingress node;
determining destination security group information, using said processor, wherein
said destination security group information is determined using said destination address; and
performing access control processing on said packet, using said processor, wherein
said access control processing comprises
comparing said destination security group information and said source security group information.

2. The method of claim 1, wherein
said security group information is a source security group identifier, and
said destination group information is a destination security group identifier.

3. The method of claim 1, further comprising:
sending a first packet from said ingress node, wherein
said first packet comprises
source security group information of said first packet, and
a destination address of said first packet,
said source security group information of said first packet identifies said source security group,
said destination address of said first packet is an address of a destination of said first packet, and
said destination of said first packet is said network node.

4. The method of claim 3, further comprising:
receiving access control information at said ingress node, wherein
said receiving said access control information is in response to receiving a reply to said sending said first packet,
said access control information comprises
said destination security group information, and
said destination address,
said destination security group information identifies a destination security group, and
said network node is a member of said destination security group.

5. The method of claim 4, wherein said receiving said access control information comprises:
receiving a control packet at said ingress node, wherein
said control packet comprises said access control information.

6. The method of claim 4, further comprising:
associating said security group information and said destination address with one another.

7. The method of claim 6, wherein said associating comprises:
creating a binding at said ingress node, wherein
said binding is between said destination security group information and said destination address.

8. The method of claim 7, further comprising:
deleting said binding in response to a criteria being met.

9. The method of claim 7, further comprising:
receiving a second packet at said ingress node; and
filtering said second packet using said binding.

10. The method of claim 5, further comprising:
receiving said first packet at said ingress node;
determining if a binding between said destination security group information and said destination address exists;
if said binding exists,
performing said access control processing; and
if said binding does not exist,
performing said sending said first packet, wherein
said sending said first packet sends said packet to an egress node,
filtering said packet at said egress node, and if said first packet is denied as a result of said filtering at
said egress node,
sending said control packet from said egress node to
said ingress node.

11. The method of claim 5, wherein
said control packet is a modified Internet Control Message
Protocol (ICMP) packet.

12. The method of claim 1, further comprising:
determining if a binding between said destination security
group information and said destination address exists;
if said binding exists,
performing said access control processing; and
if said binding does not exist,
sending said first packet to said network node.

13. The method of claim 1, wherein said sending said first
packet to said network node comprises:
receiving said packet at an egress node;
filtering said packet at said egress node; and
if said first packet is denied as a result of said filtering at
said egress node,
sending a control packet from said egress node to said
ingress node,
wherein
said control packet comprises said access control
information, and
said access control information comprises
said destination security group information, and
said destination address.

14. The method of claim 1, further comprising:
receiving access control information at said ingress node,
wherein
said access control information comprises
said destination security group information, and
said destination address,
said destination security group information identifies a
destination security group, and
said network node is a member of said destination security group.

15. A computer program product comprising:
a plurality of instructions, comprising
a first set of instructions, executable on an ingress node
of a network,
configured to receive a packet, wherein
said network comprises a plurality of nodes,
said ingress node is one of said plurality of nodes,
said packet is configured to be received from a source
node communicatively coupled to said network at
said ingress node,
said packet comprises
source security group information, and
a destination address,
said destination address is an address of a network
node communicatively coupled to said network,
said source security group information identifies a
source security group,
said source node is a member of said source security
group, and
said network node is a destination of said packet,
a second set of instructions, executable on said ingress
node, configured to extract said destination address
from said packet,
a third set of instructions, executable on said ingress
node, configured to determine destination security
group information, wherein
said destination security group information is determined using said destination address,
a fourth set of instructions, executable on said ingress
node, configured to perform access control processing on said packet, wherein
said fourth set of instructions comprise
a first subset of instructions, executable on said
ingress node, configured to compare said destination security group information and said
source security group information; and
a computer-readable storage medium, wherein said
instructions are encoded in said computer-readable storage medium.

16. The computer program product of claim 15, wherein
said instructions further comprise:
a fifth set of instructions, executable on said ingress node,
configured to receive access control information at said
ingress node, wherein
said access control information comprises
said destination security group information, and
said destination address,
said destination security group information identifies a
destination security group, and
said network node is a member of said destination security group.

17. The computer program product of claim 16, wherein
said instructions further comprise:
a sixth set of instructions, executable on said ingress node,
configured to send a first packet from said ingress node,
wherein
said first packet comprises
source security group information of said first packet,
and
a destination address of said first packet,
said source security group information of said first
packet identifies said source security group,
said destination address of said first packet is an address
of a destination of said first packet, and
said destination of said first packet is said network node.

18. The computer program product of claim 17, wherein
said instructions further comprise:
a seventh set of instructions, executable on said ingress
node, configured to associate said security group information and said destination address with one another,
wherein
said seventh set of instructions comprises
a first subset of instructions, executable on said
ingress node,
configured to create a binding at said ingress node,
said binding is between said destination security group
information and said destination address.

19. The computer program product of claim 15, wherein
said instructions further comprise:
a fifth set of instructions, executable on said ingress node,
configured to determine if a binding between said destination security group information and said destination
address exists;
a sixth set of instructions, executable on said ingress
node, configured to perform said access control processing, if said binding exists; and
a seventh set of instructions, executable on said ingress
node, configured to send said first packet to said network node, if said binding does not exist.

20. A computer system comprising:
a processor;
a computer-readable storage medium coupled to said processor; and a plurality of instructions, encoded in said computer-readable storage medium and configured to cause said processor to
   receive a packet at an ingress node of a network, wherein
      said network comprises a plurality of nodes,
      said ingress node is one of said plurality of nodes,
      said packet is received from a source node communicatively coupled to said network at said ingress node,
      said packet comprises
         source security group information, and
         a destination address,
      said destination address is an address of a network node communicatively coupled to said network,
      said source security group information identifies a source security group,
      said source node is a member of said source security group, and
      said network node is a destination of said packet;
   extract said destination address from said packet, using a processor of said ingress node;
   determine destination security group information, using said processor, wherein
      said destination security group information is determined using said destination address; and
   perform access control processing on said packet, using said processor, wherein
      said access control processing comprises
         comparing said destination security group information and said source security group information.

* * * * *